United States Patent [19]
Smith

[11] Patent Number: 5,350,032
[45] Date of Patent: Sep. 27, 1994

[54] POWER CONVERSION KIT FOR WHEELCHAIR

[76] Inventor: Terry W. Smith, 3618 NE. 167th Street, North Miami Beach, Fla. 33160

[21] Appl. No.: 44,818

[22] Filed: Apr. 8, 1993

[51] Int. Cl.⁵ .............................................. B60K 1/02
[52] U.S. Cl. .................... 180/65.6; 180/6.5; 180/907; 280/304.1
[58] Field of Search ........... 180/6.2, 6.5, 6.48, 180/65.1, 65.6, 907; 280/304.1, 288.4, 304.2; 297/DIG. 4

[56] References Cited

U.S. PATENT DOCUMENTS

| | | | |
|---|---|---|---|
| 3,930,551 | 1/1976 | Cragg | 180/907 X |
| 4,436,320 | 3/1984 | Brudermann et al. | 180/907 X |
| 4,960,287 | 10/1990 | Lautzenhiser et al. | 180/907 X |
| 4,961,473 | 10/1990 | Jones | 180/907 X |
| 5,161,630 | 11/1992 | Garin, III et al. | 180/65.2 |
| 5,186,269 | 2/1993 | Avakian et al. | 180/6.5 |
| 5,199,520 | 4/1993 | Chen | 180/907 X |
| 5,234,066 | 8/1993 | Ahsing et al. | 180/65.2 X |

Primary Examiner—Margaret A. Focarino
Assistant Examiner—Michael Mar

[57] ABSTRACT

A kit for power conversion of a manually powered wheelchair is provided wherein one or more power hubs are integrated into the rear drive wheels of such chair to effect propulsion thereof by means of a simple controller mounted to the armrest of the chair. This power conversion kit is unique in several respects in that it mounts to the existing frame of a wheelchair of "standard" design at the same location and through the same holes provided for mounting of the original rear wheels. Moreover, the conversion kit is further provided with a supporting fixture for the powered rear wheels which is designed to both (a) maintain the original clearances of the manually powered chair (so as not to subject the occupant to any inconvenience or distress in its operation) and (b) effectively shift the center of balance of the chair to enhance its stability during powered operation. This fixture has three defined area or segments; a first (coupling) segment which mounts directly to the chair frame at the same location and through the same holes of the support for the rear wheels which it replaces; a second (offsetting) segment which connects the first segment to the third segment (motor support); and, the third segment provides a stator for the power drive assembly to which the rear wheel is supported and driven. The second or transitional segment is unique by design in that it effectively positions the power drive assembly inboard so as to maintain the width of the chair, as thus modified, essentially the same as the manually powered chair, while insuring enhanced stability by increasing the chairs forward weight distribution during powered operation.

6 Claims, 4 Drawing Sheets

POWER CONVERSION KIT FOR WHEELCHAIR

BACKGROUND OF THE INVENTION

1. Field Of The Invention

This invention relates to a kit for conversion of a manually powered wheelchair to one which is driven by power hubs which are integrated into the rear drive wheels. More specifically, this invention provides a unique combination of components both for the mounting and driving of the wheelchair's rear wheels so as to preserve the maneuverability of the chair while at the same time enhancing its stability as a powered conveyance.

2. Description Of The Prior Art

The manually powered wheel chairs in use throughout the world have certain basic physical and functional qualities which are common to all such chairs. Generally, such chairs are, by design, similar in their overall physical dimensions to allow for passage through doorways and share other similar features to allow for their collapse (folding) during transit in a car or other similar vehicle. Other similarities are also apparent in the seat and seat back construction and weight distribution, which permit the occupant to elevate the front wheels to navigate a curb or other obstruction. Generally, the individual confined to a manually powered wheelchair is relatively physically robust and can assist himself (in an emergency) should the circumstances require it.

Unfortunately, the confinement of an individual to a powered wheelchair is generally indicative of an individual's reduced physical strength and/or manual dexterity. Accordingly, such powered chairs must be designed with such an individual in mind and must accommodate increased dependency of the individual on the chair's stability and maneuverability. Moreover, because of such individual's reduced physical, and possibly mental, faculties, the powered chair must also anticipate the effects of a power failure and permit its manual operation without elaborate disengagement of the powered drive wheels from the gear train which connects such wheels to the drive motor.

As is further evident, powered wheelchairs require different design considerations because of the changes in weight distribution and other obvious operational differences. Generally, when an individual is required to use a powered wheelchair, such individual is unable to assist himself even in the most fundamental tasks and, thus, such chairs must, of necessity, be fully operational through the armrest mounted controller; and, upon failure of the power drive, be capable of transition to manual operation without occupant assistance. Thus, the phrase "manually operated wheelchair", as that phrase is used in the description and characterization of the prior art, can be inclusive of both unpowered and powered wheelchairs to the extent that a "powered" wheelchair requires occupant assistance and/or modification (manual disengagement) of the power drive mechanism to effect transition to manual operation in the event of a power failure.

The following patents are representative of the patent literature as related to the adaptation of power drive systems to wheelchairs and similar devices. These patents are listed and discussed in chronological order, based upon their date of issue, and thus no significance is to attach to such order of listing or discussion.

U.S. Pat. No. 3,930,551 (to Cragg) describes a wheelchair (of somewhat unorthodox design) in which an electrically (battery) powered motor is coupled through a driven pinion gear to the rear (drive) wheels of a wheelchair. In the event of power failure, or interruption, the gear train can be manually disengaged by a lever (Ref. No 78) to shift the drive mechanism into "neutral" and thereby allow manual operation (free wheeling) of the drive wheels. Thus, if the occupant is of limited physical capacity, and the power drive fails, the wheelchair will be rendered inoperative, potentially exposing its occupant to needless risk and anxiety.

U.S. Pat. No. 4,436,320 (to Bruderman et al) describes an elaborate powered chassis for use as a wheelchair. In the device described by Patentees, the drive mechanism is integral with the front wheels and is otherwise dedicated to the configuration of the Patentees' chassis (not transferable to more conventional wheelchair designs). In addition to the foregoing apparent limitations, the folding of the chassis is further unique to accommodate its unorthodox construction. Patentees are otherwise silent as to the operation and mechanical design of their drive mechanism; and, it can be assumed that upon its failure, the drive wheels may become locked or resistant to manual movement.

U.S. Pat. No. 4,960,287 (to Lautzenhiser et al) describes an electrically powered wheelchair in which the battery carriage permits "quick release" of the battery to allow for folding and storage during transit of the chair in another conveyance. The electric drive motors are mounted inboard on the frame at somewhat different positions, relative to one another, so as to not change the overall width of the chair and yet minimize interference upon collapse of the frame and folding of the chair (see FIG. 2). Patentees are otherwise silent as to the operation and mechanical design of their drive mechanism; and, it can be assumed that upon its failure, the drive wheels may become locked or resistant to manual movement.

U.S. Pat. No. 4,961,473 (to Jones) describes a kit for conversion of a manually powered wheelchair wherein a pair of power driven rollers engages the existing (unmodified) rear wheels of the converted chair. The motor drive assembly includes a gear train (worm gear) that couples the output shaft of the motor to power transfer rollers. Apparently, the gear train does not allow free wheeling of the chair, in the event of power failure or interruption. and, thus, the Patentee has provided for manual engagement and disengagement of the motor drive assembly from the rear wheels of the chair by means of a lever (Ref. No 60) to permit manual operation of chair.

U.S. Pat. No. 5,161,630 (to Garin et al) describes a motorized wheelchair drive assembly that can be selectively engaged or disengaged by the occupant thereof to permit use of the chair in either the manual or motorized mode. The drive assembly described by the Patentees is mounted on the hub of the rear wheels of the chair; and, the motor thereof is mechanically coupled to the rear wheel by means of a worm gear assembly. The configuration of Patentees' power drive assembly requires the addition of two drive motors (Ref. No. 72), a worm gear (Ref. No 114), supporting structure mounted inboard of the rear wheel (on the chair frame) and a drive hub (Ref. No. 120) outboard of the rear wheel. In order to accommodate and mount all this additional hardware, the chair frame is modified by the addition of a metal plate (Ref. No 124). As is evident from the foregoing, the above power drive assembly changes not only the overall width of the chair but also introduces additional mechanical components which can interfere with collapse and folding of the chair during the transit thereof. In order to disengage the gear train from the drive hub to permit manual operation of the chair in the event of power interruption, the occupant must manually actuate the "U" shaped handles (Ref. No. 146) pivotally mounted on each of such hubs.

As is evident from the foregoing discussion, the adaptation of a power drive assembly to a wheelchair has been beset with a number of subtle mechanical and operational problems. It is clear that in most, if not all instances, the interruption of power to the drive wheels will render the chair inoperative. To the extent the drive wheels can be disengaged to allow for manual operation, such disengagement generally requires physical manipulation of one or more levers or handles to effect such release.

Accordingly, there remains a continuing need for a simple and cost effective power drive assembly for a wheelchair which is both easy to install, does not otherwise adversely alter the handling characteristics of the chair and allows for manual operation of the chair in the event of power interruption, without occupant intervention or manual disengagement of the power drive assembly.

OBJECTS OF THE INVENTION

It is the object of this invention to remedy the above as well as related deficiencies in the prior art.

More specifically, it is the principle object of this invention to provide a kit for conversion of a manually powered wheelchair to one that is motor driven.

It is another object of this invention to provide a power conversion kit for a manually powered wheelchair which does not affect substantial change in the chair's overall (standard) dimensions and yet permits its ready collapse and folding during the transport thereof.

It is yet another object of this invention to provide a power conversion kit for a manually powered wheelchair which does not require physical or mechanical disengagement of the power drive assembly from the drive wheels, upon interruption of power, to allow resumption of manual operation thereof.

Additional objects of this invention include a method for power conversion of a manually operated wheelchair and to the use thereof in the transport of an individual.

SUMMARY OF THE INVENTION

The above and related objects are achieved by providing a power conversion kit for a manually operated wheelchair of standard design, which includes means for mounting a power drive assembly to the existing chair frame at the same location and through the existing frame holes as were occupied by the mounting hardware for the original rear wheels. The mounting means includes a "z" shaped bracket having three defined areas or segments, a first (coupling) segment, a second (offsetting) segment and a third (power hub) segment.

The first segment is adapted to engage the chair frame and mount thereto at the same location and through the same holes formerly occupied by the hardware used to mount the original rear wheels of the chair. The advantages of this design include the preservation of alignment of the rear wheels relative to overall chair geometry. The second segment provides for rearward displacement of the rear wheels from their original location to stabilize the chair for powered operation. The relocation of the rear wheels in this manner shifts the center of balance of the chair forward, thereby reducing the chair's tendency to elevate the front wheels during powered operation. This second segment also aligns the third (power hub) segment in relation to the frame and relative to each of its counterparts so as to minimize interference thereof during collapse and folding of the chair. The third segment provides the stator for the electric motor of the power hub. The power hub is further provided with a "spur gear train" for transfer of power from the electric motor to the rear wheels so as to permit manual operation of the chair in the event of power interruption without manual disengagement of the power drive assembly from the drive wheels. The phrase "spur gear train" is used herein in the conventional sense to describe an array of gears within a power transfer assembly wherein the gear axis is parallel to the rotary motion of the drive motor and to the rotor which supports the rear drive wheels.

In the operation of the improved wheelchair of this invention, an armrest mounted controller is also provided to selectively activate the power hubs located on the rear drive wheels and thereby permit operator initiated directional movement and dynamic braking of the wheelchair. The controller initiates and arrests movement of the chair so long as power is provided thereto. Where the controller is turned off, or power to the controller is interrupted, the power transfer assembly permits a degree of "free wheeling" so as to permit the manual movement/operation of the rear drive wheels. The phrase "free-wheeling" as used in the context of power drive system of this invention, is intended to refer to the ability to manually operate the wheelchair in the event of power interruption, however, does not contemplate the total elimination of resistance ("passive" braking or drag) placed upon rear wheel movement by the spur gear train. In the process of removal of the original drive wheels and the replacement thereof with the conversion kit of this invention, the original hand brake is retained and simply adjusted to manually engage the drive wheels of the conversion kit in the same manner as the original wheels. Thus, the wheelchair will remain at rest even upon a slight incline to allow the reassembly thereof and/or allow the person opportunity to set a hand brake prior to moving from bed or a car seat to the chair.

BRIEF DESCRIPTION OF THE DRAWINGS

In the description of the of the drawings provided herein, it is assumed that the identification of the views as right or left is based upon viewing of the chair from the rear.

DETAILED DESCRIPTION OF THE INVENTION INCLUDING PREFERRED EMBODIMENTS

Figure 1:
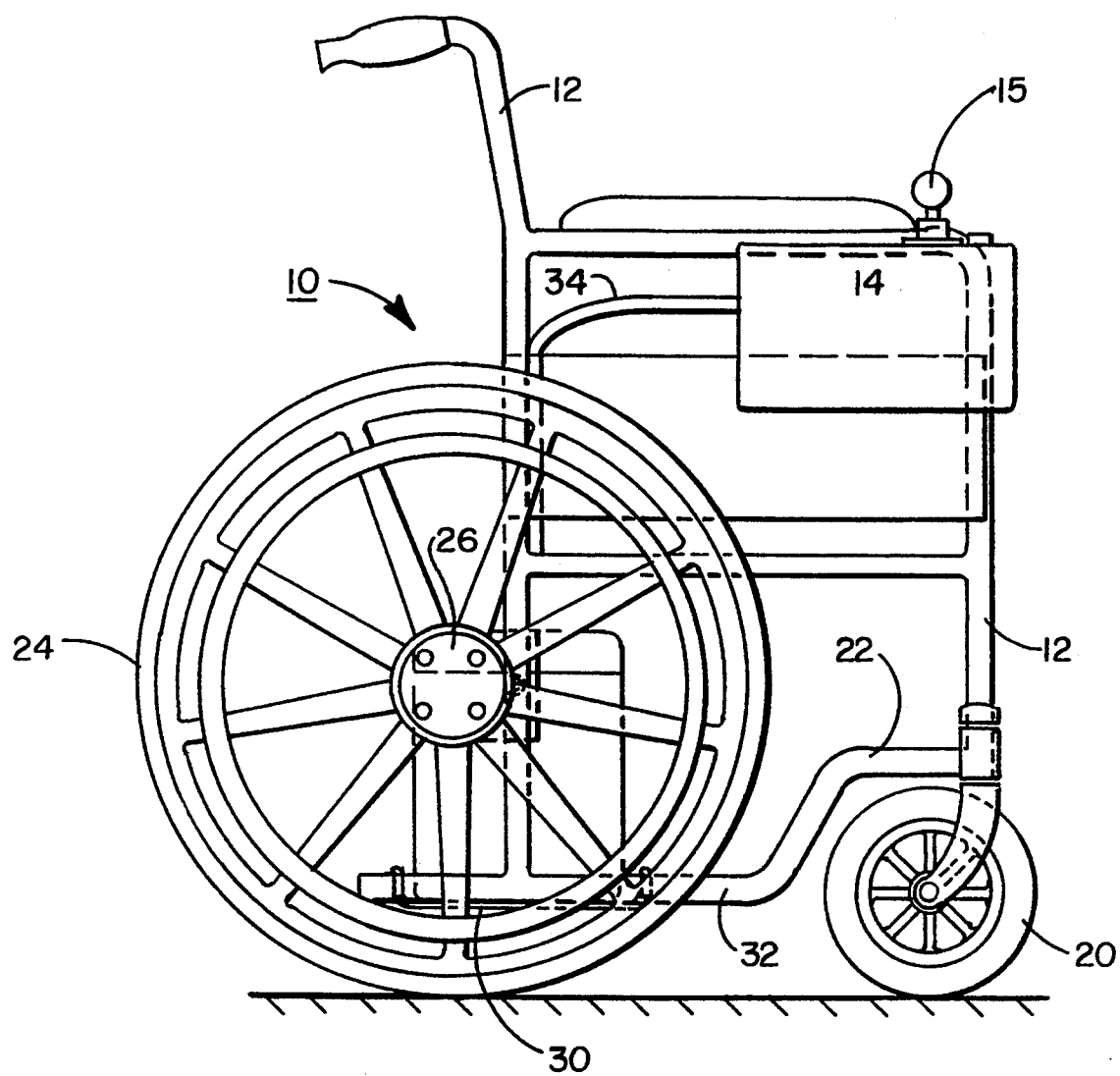
FIG. 1 is a right side view of a wheelchair equipped with a power conversion kit of this invention.

The following description of the invention is made in reference to one or more of the above Figures. Where a component or structure is the same in more than one Figure, it is assigned a common reference numeral for ease of understanding and continuity of discussion.

As is readily appreciated by the art, the basic or traditional design of manually powered wheelchairs has become essentially standardized in that the overall dimensions for such chairs need conform to the environment of their intended use. Accordingly, for the purposes of this invention, the Everest & Jennings "Standard" manually operated chair, and the Rolls "Invacare" manually operated chair, (and the variations on this design), are characterized as the type of "standard" for which this conversion kit is intended. It is further appreciated that the term "standard" (as used in this context) is descriptive of a rear wheel drive chair having a collapsible frame which has been characteristic of traditional wheelchair designs.

Figure 2:
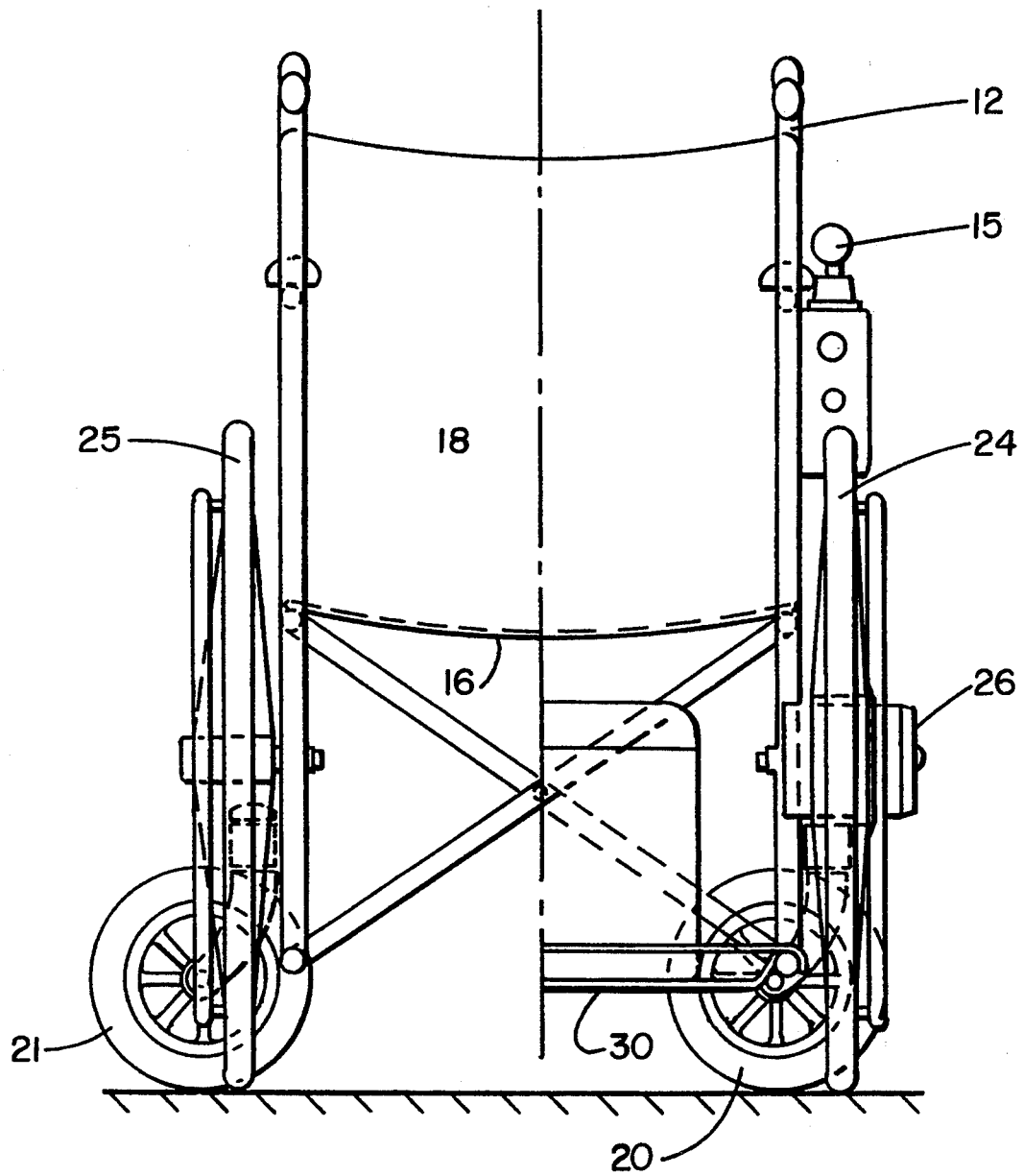
FIG. 2 is rear view of the wheelchair of FIG. 1 wherein the right rear wheel thereof is provided with the power conversion kit and the left rear wheel is manually powered.

Turning now to the preferred embodiments of the invention illustrated herein, FIG. 1 depicts a right side view of a one of the preferred embodiments of this invention. More specifically, FIGS. 1 and 2 depicts an electrically powered wheelchair (10) having a frame (12), an armrest mounted controller (14), a collapsible seat (16) and seat back (18), from swivel wheels (20,21) pivotally mounted to the underside (22) of the from of the frame and a rear drive wheel (24) and a power hub (26) mounted upon a support fixture (28) which is bolted to the chair frame at the same location as the original rear drive wheels which it replaces. A cradle (30) is provided at the base (32) of the frame to support the battery which supplies the power to the controller (14) which selectively feeds current to each of the electric motors of the power hubs. An electrical cable (34) connects the controller to both the battery and to each of the power hubs (26,27) to enable the chair's occupant to engage and selectively power either one or both such power hubs.

FIG. 2 depicts, by way of a split screen comparison, rear drive wheel position, relative to the chair frame, for both an electrically powered chair (of FIG. 1) and a manually operated chair. The split screen illustration provided in such comparison is essentially dram to true proportions and illustrates the preservation of the physical dimensions (both internal and external) of the standard chair by the conversion kit of this invention. More specifically, the power conversion kit of this invention mounts to the chair frame at the same location and through the same holes used to secure the manually powered rear wheel which it replaces. Thus, the basic alignment of such replacement wheel, and its associated power drive, is the same as the original (manually powered) rear wheel. Moreover, because the mounting bracket or fixture (28) of the conversion kit, which attaches to the frame, is engineered to accommodate the unique demands of such conversion, rear wheel (24) and the power hub (26) are displaced to the rear from the mounting plane of the original wheel to effect a forward shift in the center of balance of the chair and thereby enhance the chair's stability during powered operation. In the conversion of the standard chair from manual to electric power with the kit of this invention, the manual hand brake (not shown) is retained and simply adjusted to accommodate the displacement of the drive wheels to the rear of the frame by the kit's mounting bracket.

Figure 3:
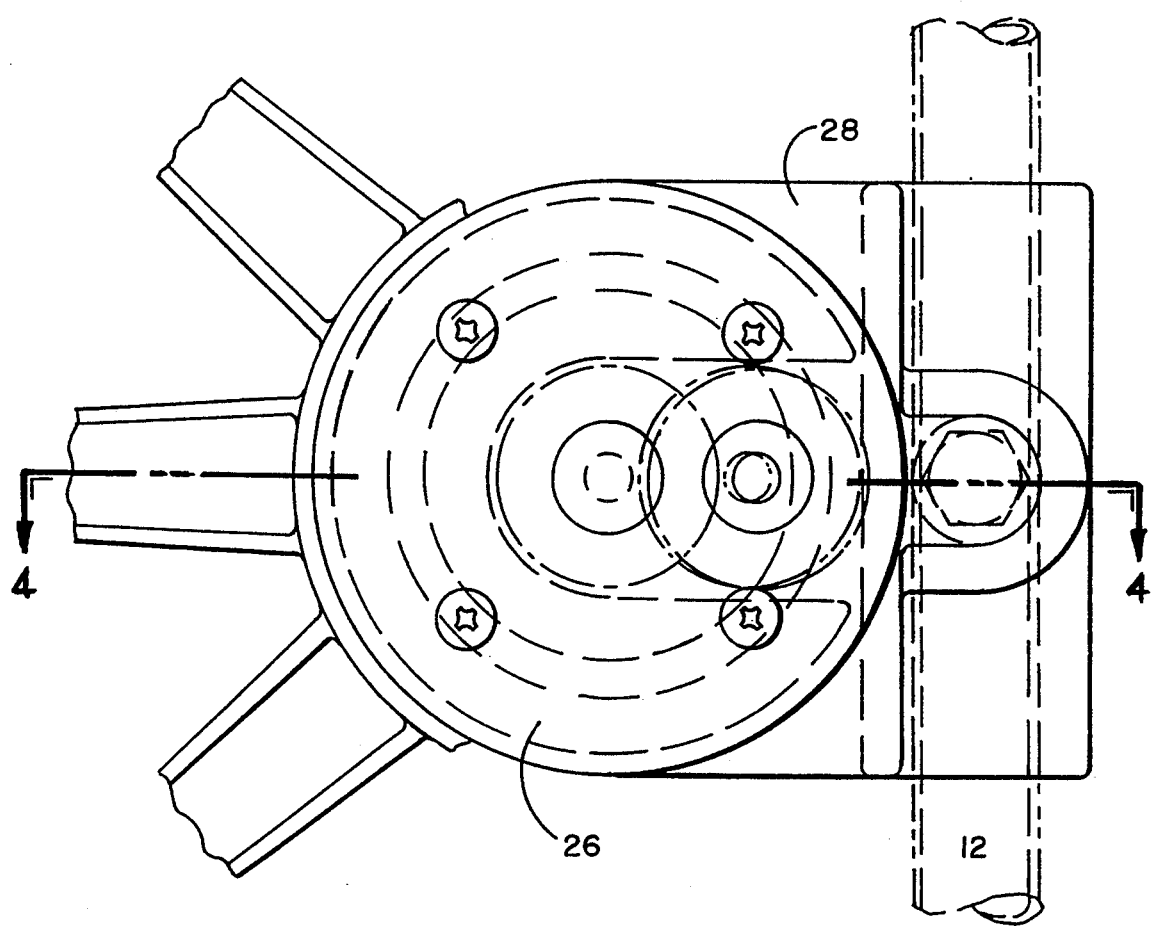
FIG. 3 is an enlarged right side view of a power hub and mounting bracket (fixture) designed for attachment to the right side of the chair frame.
Figure 4:
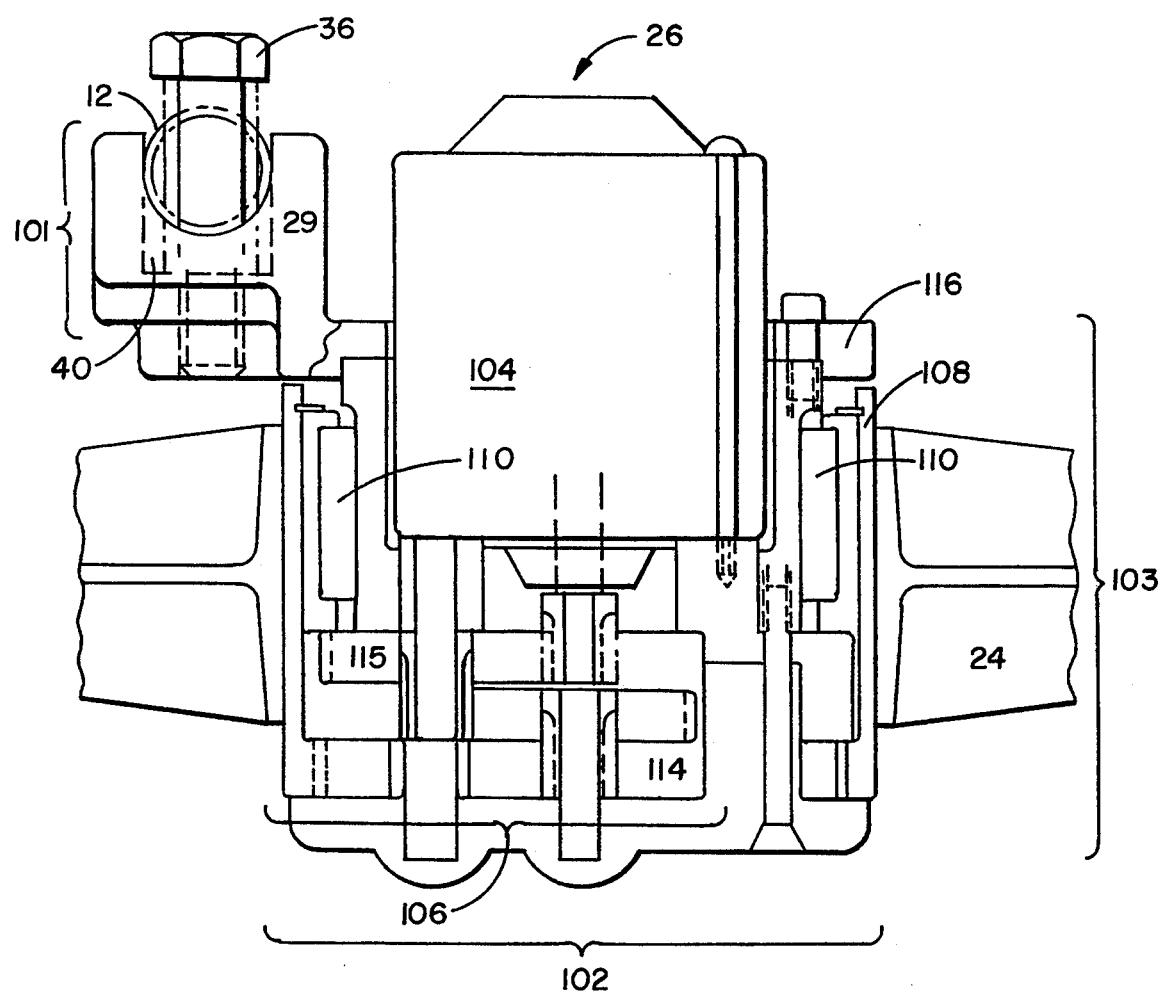
FIG. 4 is a centerline section of the power hub and mounting bracket of FIG. 3 at AA when viewed from below.

As more fully depicted in FIGS. 3 and 4, the mounting bracket (28) is attached to the chair frame (12) by bolts (36) which affix the bracket (28) to the frame at the same position as the original rear wheel which it replaces. The bracket (28) includes an elongate "U" shaped channel (29) conforming in both shape and depth to the portion of the frame to which it is designed to engage. In the preferred embodiments of this invention, the an elongate "U" shaped channel includes a molded seat (30) to permit more complete conformance of the bracket to the frame without any distortion thereof. Unlike the original mounting hardware, the bracket (28) of the power conversion kit has three (3) distinct segments, each of which is uniquely designed to accommodate the power conversion of the so-called "standard" chair, while preserving its overall maneuverability and portability; and, in addition, further enhancing its stability for powered operation. The three defined areas or segments are as follows: a first (coupling) segment (101), a second (offsetting) segment (102) and a third (power hub) segment (103). The first segment (101) is adapted to engage the chair frame (12) and mount thereto at the same location and through the same holes formerly occupied by the hardware used to mount the original rear wheels of the chair. The advantages of this design include the preservation of alignment of the rear wheels relative to overall chair geometry. The second segment (102) provides for rearward displacement (offsetting) of the rear wheels from their original location to stabilize the chair for powered operation. The relocation of axis of rotation of the rear wheels in this manner shifts the center of balance of the chair forward, thereby reducing the chair's tendency to elevate the front wheels during powered operation. This second segment (102) also aligns the third (power hub) segment (103) in relation to the frame (12) and relative to each of its opposite counterpart so as to minimize interference thereof during collapse and folding of the chair. The third segment (103) provides the stator for the electric motor (104) of the power hub (26). The power hubs (26,27) are each further provided with a spur gear train (106) for transfer of power from the electric motor (104) to the rear wheels (24,25) so as to permit manual operation of the chair in the event of power interruption without manual disengagement of the power drive assembly (110) from the drive wheels (24,25).

Power hubs and power drive assemblies (including spur gears) are well-known. The following patents are representative of power hubs and of various types of power transfer assemblies; and, are thus simply referenced herein to shown the state of the art: U.S. Pat. Nos. 2,726,726; 3,820,617; 4,330,045; and 4,930,590. It should be emphasized that notwithstanding the existence of similar power transfer systems, none of the foregoing patents contemplates or suggests the use of such systems to power wheelchairs.

In the preferred embodiments of this invention depicted in FIG. 4, the power hub (26) consists of an electric motor (104) and a spur gear train (106) for transfer of power to a rear drive wheel (24). FIG. 4 further depicts a rear drive wheel rotor (108) supported on a roller bearing (110) and coupled to a spur gear tram (106). The gear train (106) is housed within a stator (112) and consists of a plurality of journals (not shown) within the stator (112), each internally mounted with a spur gear (114,115) and piloted and fitted to a roller bearing (110). A rotor (114) is supported and fitted to an outer race of the roller bearing assembly (110), which assembly utilizes the stator surface as an inner race. The spur gear design of choice consists of either the conventional spur gear or the more preferred epicyclic gearing. In each case, the gears rotate around on a parallel axis to the electric motor and drive the rotor. The rotor gear transfers power to the rotor which can be fitted with a rim, tire or capstan which, at the desired gear ratios, permits the wheelchair to operate at speeds in the range of from about 3 to about 8 miles per hour.

The power hub can be mounted in various configurations relative to the power output device (wheel, capstan etc.) depending upon the support or mounting bracket and the application involving its use. The power hub is activated by an electronic controller operated much in the same manner as a "joy" stick (15) commonly found in video games. The preferred controller for use in conjunction with the other components of the conversion kit is manufactured by *Dynamic Controls Ltd.* Christchurch, New Zealand, (Model #DM 451E81) With the *Dynamic Controls* controller, power transfer to the electric motors of the power hubs is arrested by simply placing the controller in a neutral position. In this neutral position, the controller provides "dynamic" braking of the chair's rear wheels. In the event of power interruption or when the controller is turned off, the power transfer assembly permits a degree of "free wheeling" so as to permit the manual movement/operation of the rear drive wheels. The phrase "freewheeling" as used in the context of the power drive system of this invention, is intended to refer to the ability to manually operate the wheelchair in the event of power interruption, however, it does not contemplate the total elimination of resistance ("passive" braking or drag) placed upon rear wheel movement by the gear train. Thus, the wheelchair will remain at rest even upon a slight incline to allow the reassembly thereof and/or allow the person an opportunity to set the hand brake prior to moving from a bed or a car seat to the chair. In the preferred embodiments of this invention, the energizing of the controller will provide dynamic braking of the rear drive wheels to also allow for a safe transition of the occupant to and from the wheel chair.

The power conversion kit of this invention has been described with reference to its preferred embodiments, as depicted in the accompanying Figures, and are illustrative thereof. Such description and accompanying Figures are thus provided as explanatory of such invention and not as delineating its scope, which is set forth in the claims appended hereto.

What is claimed is:

1. A power conversion kit to motorize a wheelchair of standard design which is provided with a frame which includes a pair of vertically extending rear frame members and a pair of manually driven original right and left rear wheels, each rear wheel being mounted to a respective rear frame member and having an axis of rotation which intersects the rear frame member said conversion kit comprising a pair of matched components for replacement of each of said right rear drive wheel and said left rear drive wheel, each member of said pair of matched components including:

a. means for mounting a power drive assembly to a frame of a wheelchair of standard design, at the same location, and through the same holes, formerly occupied by hardware used to mount the original rear drive wheels of the wheelchair, said mounting means comprising an essentially "z" shaped bracket having three defined areas or segments, a first (coupling) segment, a second (offsetting) segment and a third (power hub) segment the first segment of said bracket being adapted for mechanically coupling the bracket to the respective rear frame member of the wheelchair at the same location on the chair frame formerly occupied by the original rear wheels of said wheelchair, the second segment of said bracket being adapted for displacing a power driven rear drive wheel to a new central rotational axis located rearwardly of the rotational axis of the original manually driven wheel which extends through the rear frame member so as to effect a forward shift in the wheelchair's center of balance, and being further adapted for aligning the third segment inboard, in relation to the frame, so as to maintain the wheelchair's original dimensions and to minimize interference of said power hubs with the wheelchair's frame during collapse and folding of the wheelchair, and the third segment of said bracket being adapted to provide a stator for a power drive assembly;

b. a power drive assembly comprising a power driven rear drive wheel, a power hub mechanically coupled to said rear drive wheel at the hub thereof for roller bearing support of the drive wheel about the new central rotational axis, said power hub being further characterized as having a controller activated motor and a spur gear array for power transfer engagement of the motor with the hub of said rear drive wheel; and c. a controller for operator engagement and selective activation of each of the power hubs of said conversion kit, said controller enabling both directional movement of a motorized wheelchair equipped with said power hubs in response to operator initiated input to said controller, and dynamic braking thereof when the controller is placed in a neutral position by the operator.

2. The power conversion kit of claim 1, wherein the first segment of the bracket includes an elongate channel and a molded seat within said channel, said seat conforming in shape to a tubular portion of the rear frame member so as to facilitate mounting of the bracket to the tubular frame.

3. The power conversion kit of claim 1, wherein the power hub of the power drive assembly includes a planetary gear array wherein the planetary gears are epicyclic.

4. The power conversion kit of claim 1, wherein the gear ratio of the power transfer engagement of the motor with the hub of said rear drive wheel is effective to propel the wheelchair at a speed of about 3 to about 8 miles per hour.

5. The power conversion kit of claim 1, wherein the spur gear array allows for manual operation of the rear drive wheels in the event of interruption of power to the power hub.

6. In an improved motorized wheelchair of standard design having a pair of rear power driven drive wheels mounted to individual power hubs, a controller for operator engagement and selective activation of the individual power hubs and means for collapse and folding of the wheelchair, the improvement comprising:
   a. means for mounting a power drive assembly to a frame of a wheelchair of standard design, at the same location, and through the same holes, formerly occupied by hardware used to mount an original pair of manually driven rear drive wheels of the wheelchair, each of the manually driven rear drive wheels having a central rotational axis extending through a respective one of a pair of vertically extending rear frame members of the wheelchair, said mounting means comprising an essentially "z" shaped bracket having three defined areas or segments, a first (coupling) segment, a second (offsetting) segment and a third (power hub) segment
      the first segment of said bracket being adapted for mechanically coupling the bracket to the frame of the wheelchair at the same location on the chair frame formerly occupied by the original rear wheels of said wheelchair,
      the second segment of said bracket being adapted for displacing a power driven rear drive wheel to a new central rotational axis located rearwardly of the rotational axis of the original manually driven wheel which extends through the rear frame member so as to effect a forward shift in the wheelchair's center of balance, and being further adapted for aligning the third segment inboard, in relation to the frame, so as to maintain the wheelchair's original dimensions and to minimize interference of said power hubs with the wheelchair's frame during collapse and folding of the wheelchair, and
      the third segment of said bracket being adapted to provide a stator for a power drive assembly
   b. a power drive assembly comprising a power driven rear drive wheel, a power hub mechanically coupled to said wheel at the hub thereof for roller bearing support of the drive wheel about the new central rotational axis, said power hub being further characterized as having a controller activated motor and a spur gear array for power transfer engagement of the motor with the hub of said rear drive wheel;
   c. a controller for operator engagement and selective activation of each of the power hubs of said conversion kit, said controller enabling both directional movement of a motorized wheelchair equipped with said power hubs in response to operator initiated input to said controller, and dynamic braking thereof when the controller is placed in a neutral position by the operator.

* * * * *